United States Patent
Marinescu et al.

(10) Patent No.: US 12,438,836 B1
(45) Date of Patent: Oct. 7, 2025

(54) DETECTION OF WHETHER A COMMUNICATION IS GENERATED VIA ARTIFICIAL INTELLIGENCE

(71) Applicant: SAP SE, Walldorf (DE)

(72) Inventors: Dan Cristian Marinescu, Rueil Malmaison (FR); Felix Sasaki, Potsdam (DE); Thomas Beucher, Maisons Alfort (FR)

(73) Assignee: SAP SE, Walldorf (DE)

( * ) Notice: Subject to any disclaimer, the term of this patent is extended or adjusted under 35 U.S.C. 154(b) by 1 day.

(21) Appl. No.: 18/630,699

(22) Filed: Apr. 9, 2024

(51) Int. Cl.
*G06F 15/16* (2006.01)
*H04L 51/06* (2022.01)

(52) U.S. Cl.
CPC .................... *H04L 51/06* (2013.01)

(58) Field of Classification Search
CPC ............... H04L 51/06; H04L 51/02
See application file for complete search history.

(56) References Cited

U.S. PATENT DOCUMENTS

| | | | |
|---|---|---|---|
| 7,945,952 B1* | 5/2011 | Behforooz | H04L 63/08 726/21 |
| 10,243,981 B2* | 3/2019 | Zhang | H04L 63/1441 |
| 11,870,804 B2* | 1/2024 | Kurupati | G06N 3/08 |
| 2019/0253504 A1* | 8/2019 | Wang | H04L 63/1483 |
| 2021/0152496 A1* | 5/2021 | Kim | H04L 51/02 |

* cited by examiner

*Primary Examiner* — John B Walsh
(74) *Attorney, Agent, or Firm* — SCHWEGMAN LUNDBERG & WOESSNER, P.A.

(57) ABSTRACT

In an example embodiment, a software application is introduced that is able to automatically detect whether a conversation in a chat interface is with a human or an artificial intelligence. More specifically, the software application is able to identify how the chat interface is interacted with and replicate that mechanism to allow the software application to directly contact the other party (whether human or AI) on the other side of a chat conversation.

20 Claims, 4 Drawing Sheets

DETECTION OF WHETHER A COMMUNICATION IS GENERATED VIA ARTIFICIAL INTELLIGENCE

TECHNICAL FIELD

This document generally relates to computer systems. More specifically, this document relates to detection of whether a communication in a computer system is generated via artificial intelligence.

BACKGROUND

A chatbot is a computer application that automatically responds to text input by a user with responses that mimic human responses.

A large language model (LLM) refers to an artificial intelligence (AI) system that has been trained on an extensive dataset to understand and generate human language. These models are designed to process and comprehend natural language in a way that allows them to answer questions, engage in conversations, generate text, and perform various language-related tasks. LLMs may be of varying size.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Chatbots have grown in popularity as mechanisms for users to obtain information from various entities, such as companies. Typically, the user interacts with the chatbot through a web browser interface, such as a window in which the user can enter natural language text and the chatbot responds in the same window with natural language text, similar to the way the user could interact with another user via a chat window.

While it is common for a user to be made aware of the fact that the entity that the user is interacting with in a chat window is a chatbot instead of a live person (such as by labeling the window a "chatbot"), that is not always the case. Increasingly companies are hiding the fact that their chat interface hides an artificial intelligence rather than a live person. It can be difficult for a user to detect the differences, especially the realism of the chatbot increases, as it has in many cases over the last few years.

More specially, LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

GPT models have grown in power and prevalence in the last few years and have progressed to the point where many users can be fooled into thinking they are interacting with a live person when, in reality, they are interacting with a GPT model.

In an example embodiment, a software application is introduced that is able to automatically detect whether a conversation in a chat interface is with a human or an artificial intelligence. More specifically, the software application is able to identify how the chat interface is interacted with and replicate that mechanism to allow the software application to directly contact the other party (whether human or AI) on the other side of a chat conversation.

The software application may be invoked by one party in a chat. For example, the software application may be a software plug into a web browser application run by a user, and the user can launch the software application when the user wants the software application to evaluate whether or not the user is interacting or is going to interact with a live human or an AI when communicating in the chat. In some example embodiments, the software application may run continuously in the background, evaluating new chats as they are invoked to determine if the entity on the other side of the chat is a live human or an AI.

In order to evaluate whether or not the entity on the other side of a chat is a live human or an AI, the software application first must determine how to communicate directly with the entity, in order to then communicate directly with the entity for the evaluation. This can be performed by examining the chat interface to learn how the entity is communicated with under normal circumstances.

More particularly, in a web browser embodiment, a client uniform resource locator (cURL) file may be accessed. The cURL file is a file generated by a cURL command line tool that is used to transfer data via network protocols. Using such an interface allows for web pages or portions of web pages to be downloaded, using one of many potential protocols.

The next step is to find the URL request, including the path of the chat text content, in the downloaded cURL file. For example, the following is an example cURL file:

curl 'https://cai.tools.sap/api/csr/build/v1/dialog'\
      -H 'Accept: application/json'\
      -H 'Accept-Language: en-GB,en;q=0.9,fr-FR;q=0.8,fr;q=0.7,ro-RO;q=0.6,ro;q=0.5,en-US;q=0.4'\
      -H 'Connection: keep-alive'\
      -H 'Content-Type: application/json'\
      -H 'Cookie: dtCookie=v_4_srv_22_sn_25DA6AF69561A9F0EA0C4943D4BC0254_perc_100000_ol_0_mul_1_app- 3Aea7c4b59f27d43eb_1; rxVisitor=16981365
999052SP70CQDC2739QST3L6FQMEGQ8
D2OBJJ; dtSa=-; dtPC=22$227652419_760h-
vKPNUGOQWORFHEFFKSHRU-
UJQKHKFCVBBH-0e0;
rxvt=1698243973851116982421 73851;
privacy_consent=%7B%22performance%22%3
Atrue%2C%22marketing%22%3Afalse%2C%
22functional%22%3Atrue%7D;
JSESSIONID=s%3AraaPxeLaufcte7rBEdkyQqN-
55IGJwyo.dhTAgJ%2BygNuBHJl%2BJaCf2te
Mwbpg9%2BeHq4mhgW%2Fek%
2B8; _VCAP_ID_=d8665b5c-668f-438a-7dd6-
143f'\
-H 'Origin: https://cai.tools.sap'\
-H 'Referer: https://cai.tools.sap/dancristianmarinescu/
handoverbot/train/in tents'\
-H 'Sec-Fetch-Dest: empty'\
-H 'Sec-Fetch-Mode: cors'\
-H 'Sec-Fetch-Site: same-origin'\
-H 'User-Agent: Mozilla/5.0 (Macintosh; Intel Mac OS
X 10_15_7) AppleWebKit/537.36 (KHTML, like
Gecko) Chrome/118.0.0.0 Safari/537.36'\
-H 'X-Token: Token
ac9b134d55caca7aab940a22438af50c'\
-H 'sec-ch-ua: "Chromium";v="118", "Google
Chrome";v="118", "Not=A?Brand";v="99"'\
-H 'sec-ch-ua-mobile: ?0'\
-H 'sec-ch-ua-platform: "macOS"'\
-H 'x-csrf-token: 4274f20a256e0b71-
Tok5UGX3Vwv3XqUf8-plQkoLAco'\
--data-raw
'{"message":{"type":"text","content":"hello" },"conversation id":"test-1698310335180","log_level":"info",
"client info":{"channel type":"web client"}}'\
--compressed The chat service will then respond with a message to the above request. The information the software application needs is the response text data, such as follows:

```
{
  "results": {
    "nlp": {
      "uuid": "c83033fc-c16c-44a8-639f-
d39ffd8ae447_6b2f6403-17c4-4cf1-bb67-da5b75927b17",
      "source": "hello",
      "intents": [
        {
          "slug": "greetings",
          "confidence": 0.99,
          "description": null
        }
      ],
      "entities": { },
      "act": null,
      "sentiment": "positive",
      "language": "en",
      "processing_language": "en",
      "version": "2202.1.0",
      "timestamp": "2023-10-26T08:52:24.395499+00:00",
      "status": 200,
      "type": null,
      "logs": [ ]
    },
    "messages": [
      {
        "type": "text",
        "content": "Hi there!",
        "markdown": null,
        "delay": null
      }
    ],
    "conversation": {
      "id": "test-1698310335180",
      "language": "en",
      "timezone": null,
      "memory": { },
      "initial_context": null,
      "skill": "greetings",
      "skill_occurences": 1,
      "skill_id": "e8caaea7-c8c1-4f51-9078-54b245279cca",
      "client_info": {
        "channel_type": "web_client"
      }
    },
    "logs": {
      "input": "hello",
      "logs": [
        {
          "level": "info",
          "code": "I_SKILL_TRIGGERED",
          "data": {
            "message": "Skill greetings has been triggered",
            "reason": "TRIGGERS_OK",
            "skill_id": "e8caaea7-c8c1-4f51-9078-54b245279cca"
          },
          "timestamp": "2023-10-26T08:52:24.474Z"
        },
        {
          "level": "info",
          "code": "I_REQUIREMENTS_OK",
          "data": {
            "skill_id": "e8caaea7-c8c1-4f51-9078-54b245279cca",
            "message": "Requirements of skill greetings validated, executing actions"
          },
          "timestamp": "2023-10-26T08:52:24.517Z"
        },
        {
          "level": "info",
          "code": "I_EXECUTE_ACTION",
          "data": {
            "type": "message",
            "value": {
              "type": "text",
              "content": "Hi there!",
              "markdown": null,
              "delay": null
            }
          },
          "timestamp": "2023-10-26T08:52:24.622Z"
        }
      ]
    },
    "qna": null,
    "fallback": null
  },
  "message": "Dialog rendered with success"
}
```

From this, the following parameters can be extracted to launch the software application:

1) request file (i.e., the cURL copied file)
2) input_text body/message/content
3) output_text response.results.messages[0].content The tests comprise 4 main clusters. The first cluster is network-related tests, such as comparing the response time versus the text size. The second cluster is data-related tests, such as checking language-specific characteristics, asking facts that are from recent news, and checking with a gold standard for certain questions. The third cluster is context-related tests, such as measuring the variance of the answer if multiple identical questions are asked, providing facts that a deviant/abnormal and checking if the answer is adequate to the communication context. The fourth cluster is wrong-answer tests, specifically testing for a contrary response.

Each of these clusters may be implemented as one or more machine learning models. Each of these machine learning models may be separately trained. The software application is then able to test the chat channel and give a probability that the chat is with a human or an AI. For example, the software application may provide a result in the form of: Test clusters completed: 87.5% that the respondent is a computer.

In an example embodiment, this result (87.5%) may be the result of an average f the outputs of each of the clusters. Each cluster may output a result between 0% and 100% as to the likelihood that the chat is with a human or an AI (0% meaning completely convinced it is a human and 100% meaning completely convinced it is an AI).

Each of the four clusters will now be discussed, by way of example, in more detail.

Cluster 1 includes code that will ask questions that are likely to result in long answers, such as "Can you explain with details how to create a successful business using only manpower?" and "Can you describe the Mona Lisa painting by DaVinci in a 2-page essay?" These are considered network-relate tests, since it is not the content of the response that interests the cluster but the response time. Sample questions may be stored in a folder that is accessed by the cluster. The cluster then submits the question(s) in the chat window and obtains the results. Specifically, it is looking for the response time, rather than the actual content of the results. If the response time is quick, it is more likely that the respondent is an AI.

Cluster 2 includes code that will ask questions from a data file but also includes dynamically generated data. The combination of each question and dynamically generated data may test a different aspect of the content of the response. This can include testing language specific characteristics ("A British colleague told me he has a flat, he is referring to a continuous horizontal surface?"), factual questions (such as those generated dynamically based on a specified source, like a news organization, e.g., "Is it true that at least 16 are dead in Maine mass killing and the police hunt for the shooter as the residents take shelter?", or from enterprise data, e.g., "Can you provide the field names of the CDS View I_Customer?"

In response, the cluster can use different ways to understand the responses from the chat, using keywords or pre-trained machine learning models, that are stored in a file. For language-specific characteristics, a machine learning model can be trained to identify if correspondent language synonyms are being detected (flat/apartment, boiler/grill, etc.). Facts can be checked using a machine learning model able to detect whether the response is accurate or whether a list of provided keywords matches the response.

Cluster 3 includes code that will perform context-related tests. Like with cluster 2, some of the tests include questions contained in a file along with some dynamically generated data. This can include testing variance, which tests how much variance there is in responses to identical questions. A human is unlikely to answer the same questions twice exactly the same, especially as the human grows frustrated. For example, a typical human response to these questions might be "What is 2 times 3?" "6" "What is 2 times 3?" "I told you it was 6" "What is 2 times 3?" "Why are you asking me the same question over and over?"

The tests can also look for responses to deviant facts that a human would find strange, such as "I have seen a cow with 3 heads and 2 udders, do you think its milk is good?" or "My car has 5 wheels, can I go faster in turns than wheeled cars?" If a human is answering, they are likely to cut the conversation short or not respond. A machine learning model can be trained to identify answers that are pushing back when such a deviant question is asked. A similar process can be performed to ask questions that are out of context. For example, cluster 3 may generate a paragraph describing the outcome of a baseball game and then ask an out of context question such as "In light of the above, would it be preferable to code in Java or C++?"

Cluster 4 includes code that will test for contrary responses. For trivial questions, humans are more likely to act in rigid way and stand their ground. In contrast, an AI is more likely to emphasize the potential misunderstanding of the situation. Thus, an easy question can be asked and then in response to the answer the chat can be told that they are wrong. Such as "How much is 1 plus 1" "2" "You are wrong; try again." A human would typically stand their ground in a specific way that can be detected by a machine learning model, such as "No I'm not, I am correct. Two is the right answer." An AI, on the other hand, is more likely to ask for clarification and/or apologize (e.g., "I am sorry, I must have misunderstood the question. Could you rephrase it?')

Each of the machine learning models described herein may be trained by any algorithm from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbors, decision trees, and hidden Markov models.

In an example embodiment, a machine learning algorithm used to train a machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the machine learning model may take place as a dedicated training phase. In other example embodiments, the machine learning model may be retrained dynamically at runtime by the user providing live feedback.

Figure 1:
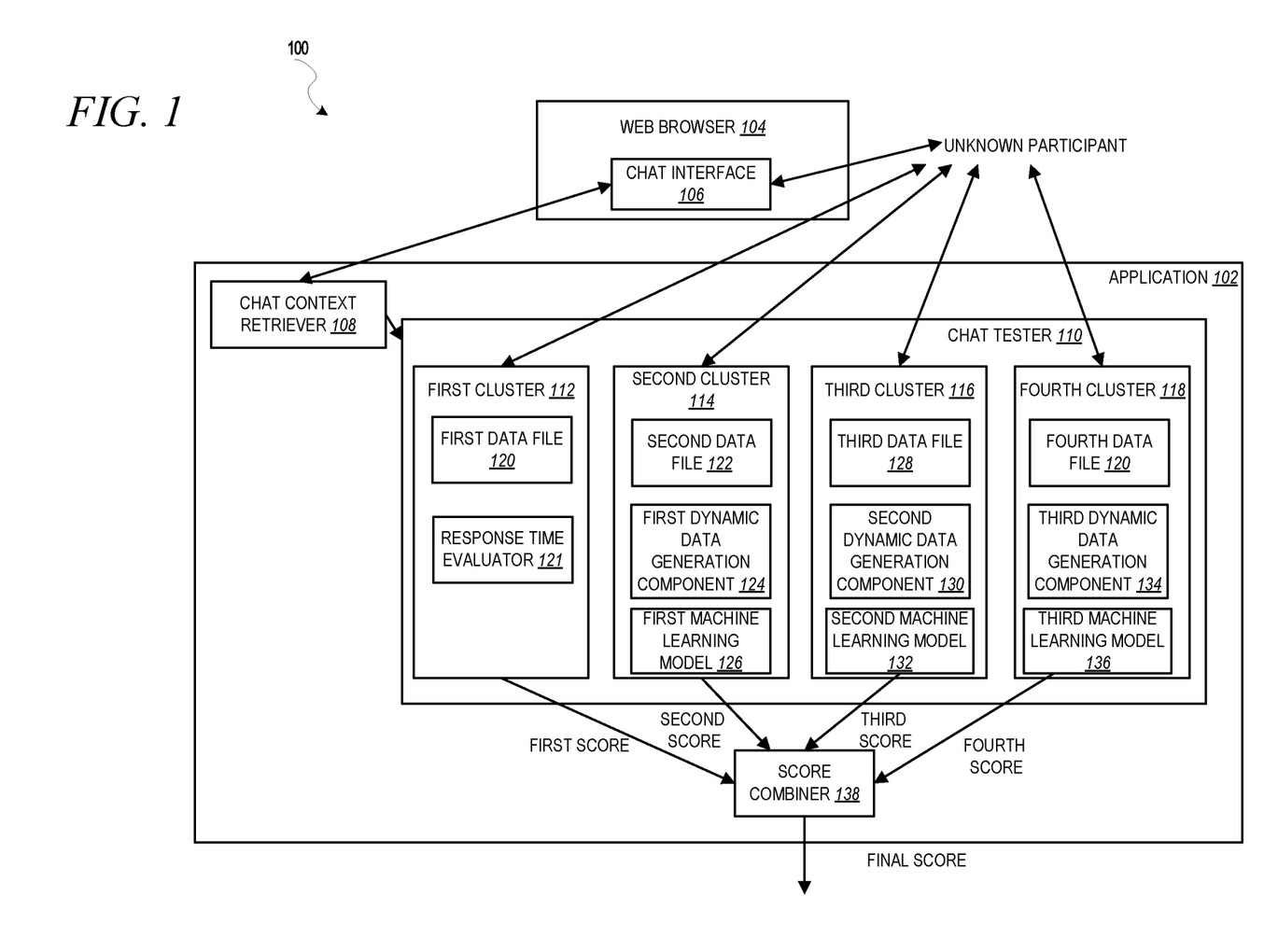
FIG. 1 is a block diagram illustrating a system for using machine learning to detect whether a conversation is being performed with a human or an AI component, in accordance with an example embodiment.

FIG. 1 is a block diagram illustrating a system 100 for using machine learning to detect whether a conversation is being performed with a human or an AI component, in accordance with an example embodiment.

The system 100 includes an application 102 that interfaces with a web browser 104. In some example embodiments, the application 102 is a plug-in for the web browser 104, while in other example embodiments the application 102 is a stand-alone application. The web browser 104 includes a chat interface 106 that is either built into the web browser 104 or is launched by the web browser (such as by execution of code or script on a web page parsed by the web browser 104). It should also be noted that while this figure depicts the chat interface 106 as operating inside a web browser 104, embodiments are foreseen where the chat interface 106 may exist outside of a web browser or even without a web browser 104 existing in the system 100 at all, such as if the chat interface 106 is included in an application that is not a web browser.

The application 102 includes a chat context retriever 108. The chat context retriever 108 acts to obtain contextual information, such as metadata and/or state information, regarding a chat that has been launched in the chat interface 106. As described earlier, this can include accessing, a client uniform resource locator (cURL) file. The chat context retriever 108 then finds the URL request, including the path of the chat text content, in the downloaded cURL file. The URL request is then used by a chat tester 110 to communicate directly with any of the chat participants. Here, this would mean communicating with a chat participant other than the participant who is running the web browser (e.g., the user of the web browser 104) to test as to whether that chat participant is a human or an AI.

It should be noted that while embodiments are described where there are only two chat participants (the user of the web browser 104 and the other participant), in some example embodiments there may be a chat having more than two participants and thus the chat tester 110 can test any of these other participants.

The chat tester 110 includes a first cluster 112, second cluster 114, third cluster 116, and fourth cluster 118. As described above, each of these clusters accesses and/or generates questions or parts of questions that are then asked of chat participant to test whether they are human or AI. Here, the first cluster 112 includes a first data file 120 with a list of questions that are intended to evoke long responses, at which point a response time evaluator 121 can test how quickly the participant responds.

The second cluster 114 includes a second data file 122 containing portions of questions but also includes a first dynamic data generation component 124 that generates dynamic data, such as language specific data, data generated from news sources, or data generated from enterprise data. Also included is a first machine learning model 126 trained to evaluate responses to questions generated using the combination of the second data file 122 and the first dynamic data generation component 124.

A third cluster 116 includes a third data file 128 containing portions of questions but also includes a second dynamic data generation component 130 that generates dynamic data, such as variant or deviant data (data that differs significantly from questions in the third data file 128). Also included is a second machine learning model 132 trained to evaluate responses to questions generated using the combination of the third data file 128 and the second dynamic data generation component 130.

A fourth cluster 118 includes a fourth data file 134 containing questions that are to be asked in a repetitive manner. Also included is a third machine learning model 136 trained to evaluate responses to these repetitive questions.

A score combiner 138 then combines all of the score's output by the first cluster 112, second cluster 114, third cluster 116, and fourth cluster 118, such as by averaging them, although other mechanisms to combine the scores, such as a weighted average, are possible as well. In the case of a weighted average, a different weight may be applied to the scores of each of the first cluster 112, second cluster 114, third cluster 116, and fourth cluster 118. In such embodiments, it is possible that these weights may themselves be learned via a machine learning model that learns which of the clusters are most important in which circumstances. Thus, for example, the weights may be dynamically adjusted at runtime based on context and circumstances (e.g., for some types of chats, the output of the first cluster 112 is more important than the others but for other types of chats, the output of the first cluster 112 is less important than the others).

Figure 2:
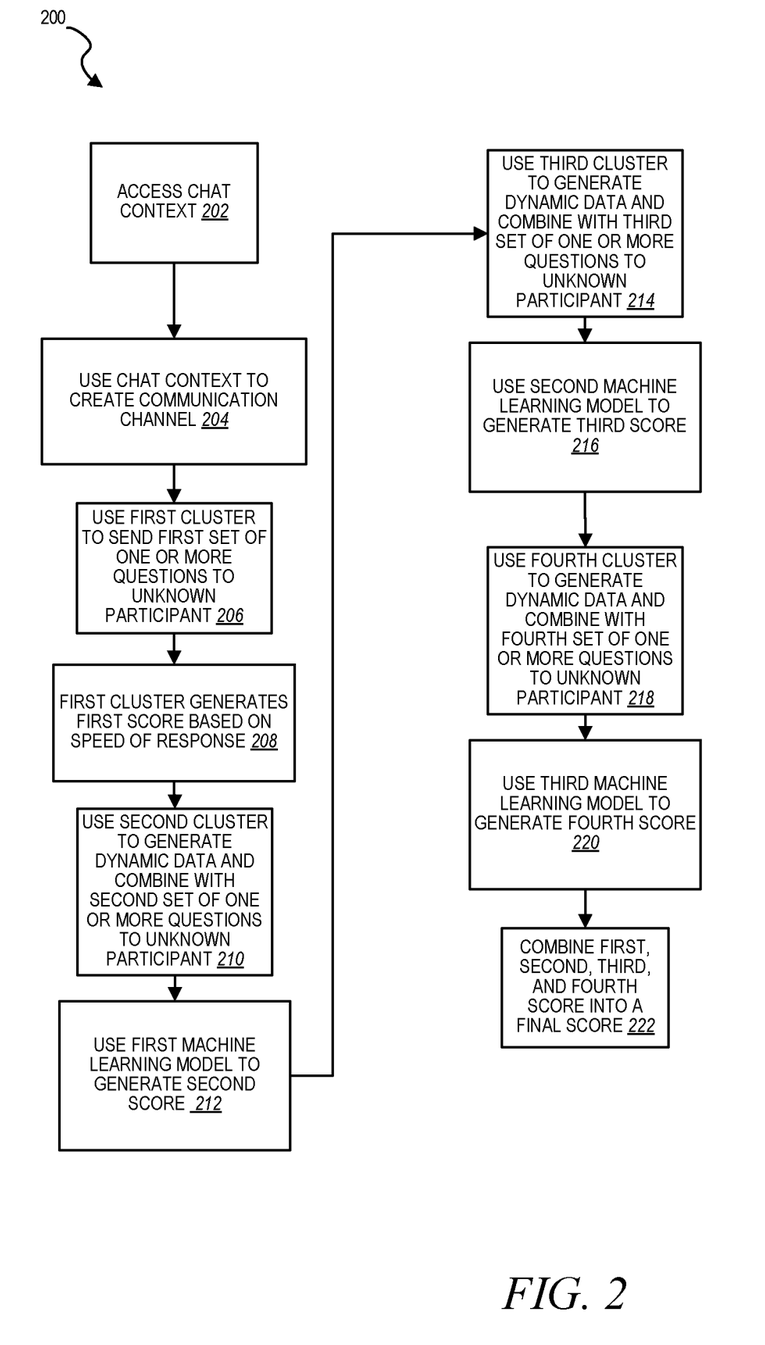
FIG. 2 is a flow diagram illustrating a method for using machine learning to test whether a chat participant is a human or an AI component, in accordance with an example embodiment.

FIG. 2 is a flow diagram illustrating a method 200 for using machine learning to test whether a chat participant is a human or an AI component, in accordance with an example embodiment. At operation 202, a chat context of an online chat is accessed. The chat context may include, for example, metadata and state information about the chat, the chat being conducted between a user participant and an unknown participant. It is the unknown participant that will be tested. At operation 204, the chat context is used to create a communication channel directly from a testing application to the unknown participant.

At operation 206, a first cluster of the testing application sends a first set of one or more questions to the unknown participant via the communication channel and measuring how quickly response(s) is/are received. At operation 208, the first cluster generates a first score indicative of a likelihood that the unknown participant is an AI, based on how quickly the response(s) was/were received.

At operation 210, a second cluster generates a first set of dynamic data and combines it with a second set of one or more questions, sending the combination to the unknown participant via the communication channel. This combination tests the content of the response(s). At operation 212, a first machine learning model evaluates response(s) and outputs a second score indicative of a likelihood that the unknown participant is an AI.

At operation 214, a third cluster generates a second set of dynamic data and combines it with a third set of one or more questions, sending the combination to the unknown participant via the communication channel. This combination tests the context of the response(s). At operation 216, a second machine learning model evaluates response(s) and outputs a third score indicative of a likelihood that the unknown participant is an AI.

At operation 218, a fourth cluster generates a third set of dynamic data and combines it with a fourth set of one or more questions, sending the combination to the unknown participant via the communication channel. This combination tests the contrariness of the response(s). At operation 220, a third machine learning model evaluates response(s) and outputs a fourth score indicative of a likelihood that the unknown participant is an AI.

At operation 222, the first, second, third, and fourth scores are combined to produce a final score indicative of a likelihood that the unknown participant is an AI.

In view of the disclosure above, various examples are set forth below. It should be noted that one or more features of an example, taken in isolation or combination, should be considered within the disclosure of this application. Example 1 is a system comprising: at least one hardware processor; and a computer-readable medium storing instructions that, when executed by the at least one hardware processor, cause the at least one hardware processor to perform operations comprising: accessing a context of an online chat between a user and an unknown participant; creating a communication channel directly between a testing application and the unknown participant, using the context; using a first cluster of the testing application to send a first question to the unknown participant and measure speed at which the unknown participant responds; generating a first score indicative of a likelihood that the unknown participant is an artificial intelligence (AI) component based on the speed; using a second cluster of the testing application to send a second question combined with dynamically generated data to the unknown participant; generating a second score indicative of a likelihood that the unknown participant is an AI component based on one or more responses to the second question; using a third cluster of the testing application to send a third question combined with dynamically generated data to the unknown participant; generating a third score indicative of a likelihood that the unknown participant is an AI component based on one or more responses to the third question; using a fourth cluster of the testing application to send a fourth question combined with dynamically generated data to the unknown participant; generating a fourth score indicative of a likelihood that the unknown participant is an AI component based on one or more responses to the fourth question; and combining the first, second, third, and first scores.

In Example 2, the subject matter of Example 1 includes, wherein the first question is a question designed to elicit a long response.

In Example 3, the subject matter of Examples 1-2 includes, wherein the second question is a question designed to check language-specific characteristics of a response.

In Example 4, the subject matter of Examples 1-3 includes, wherein the second question is a question asking facts about a recent news article.

In Example 5, the subject matter of Examples 1-4 includes, wherein the second question is a question asking facts about enterprise data.

In Example 6, the subject matter of Examples 1-5 includes, wherein the generating a second score comprises utilizing a first machine learning model trained by a first machine learning algorithm.

In Example 7, the subject matter of Example 6 includes, wherein the generating a third score comprises utilizing a second machine learning model trained by a third machine learning algorithm.

In Example 8, the subject matter of Example 7 includes, wherein the generating a fourth score comprises utilizing a third machine learning model trained by a third machine learning algorithm.

In Example 9, the subject matter of Example 8 includes, wherein the combining comprises calculating a weighted average of the first score, second score, third score, and fourth score, wherein a weight assigned to each of the first score, second score, third score, and fourth score is learned by a fourth machine learning model based on the context.

Example 10 is a method comprising: accessing a context of an online chat between a user and an unknown participant; creating a communication channel directly between a testing application and the unknown participant, using the context; using a first cluster of the testing application to send a first question to the unknown participant and measure speed at which the unknown participant responds; generating a first score indicative of a likelihood that the unknown participant is an artificial intelligence (AI) component based on the speed; using a second cluster of the testing application to send a second question combined with dynamically generated data to the unknown participant; generating a second score indicative of a likelihood that the unknown participant is an AI component based on one or more responses to the second question; using a third cluster of the testing application to send a third question combined with dynamically generated data to the unknown participant; generating a third score indicative of a likelihood that the unknown participant is an AI component based on one or more responses to the third question; using a fourth cluster of the testing application to send a fourth question combined with dynamically generated data to the unknown participant; generating a fourth score indicative of a likelihood that the unknown participant is an AI component based on one or more responses to the fourth question; and combining the first, second, third, and first scores.

In Example 11, the subject matter of Example 10 includes, wherein the first question is a question designed to elicit a long response.

In Example 12, the subject matter of Examples 10-11 includes, wherein the second question is a question designed to check language-specific characteristics of a response.

In Example 13, the subject matter of Examples 10-12 includes, wherein the second question is a question asking facts about a recent news article.

In Example 14, the subject matter of Examples 10-13 includes, wherein the second question is a question asking facts about enterprise data.

In Example 15, the subject matter of Examples 10-14 includes, wherein the generating a second score comprises utilizing a first machine learning model trained by a first machine learning algorithm.

In Example 16, the subject matter of Example 15 includes, wherein the generating a third score comprises utilizing a second machine learning model trained by a third machine learning algorithm.

In Example 17, the subject matter of Example 16 includes, wherein the generating a fourth score comprises utilizing a third machine learning model trained by a third machine learning algorithm.

Example 18 is a non-transitory machine-readable medium storing instructions which, when executed by one or more processors, cause the one or more processors to perform operations comprising: accessing a context of an online chat between a user and an unknown participant; creating a communication channel directly between a testing application and the unknown participant, using the context; using a first cluster of the testing application to send a first question to the unknown participant and measure speed at which the unknown participant responds; generating a first score indicative of a likelihood that the unknown participant is an artificial intelligence (AI) component based on the speed; using a second cluster of the testing application to send a second question combined with dynamically generated data to the unknown participant; generating a second score indicative of a likelihood that the unknown participant is an AI component based on one or more responses to the second question; using a third cluster of the testing application to send a third question combined with dynamically generated data to the unknown participant; generating a third score indicative of a likelihood that the unknown participant is an AI component based on one or more responses to the third question; using a fourth cluster of the testing application to send a fourth question combined with dynamically generated data to the unknown participant; generating a fourth score indicative of a likelihood that the unknown participant is an AI component based on one or more responses to the fourth question; and combining the first, second, third, and first scores.

In Example 19, the subject matter of Example 18 includes, wherein the first question is a question designed to elicit a long response.

In Example 20, the subject matter of Examples 18-19 includes, wherein the second question is a question designed to check language-specific characteristics of a response.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 3:
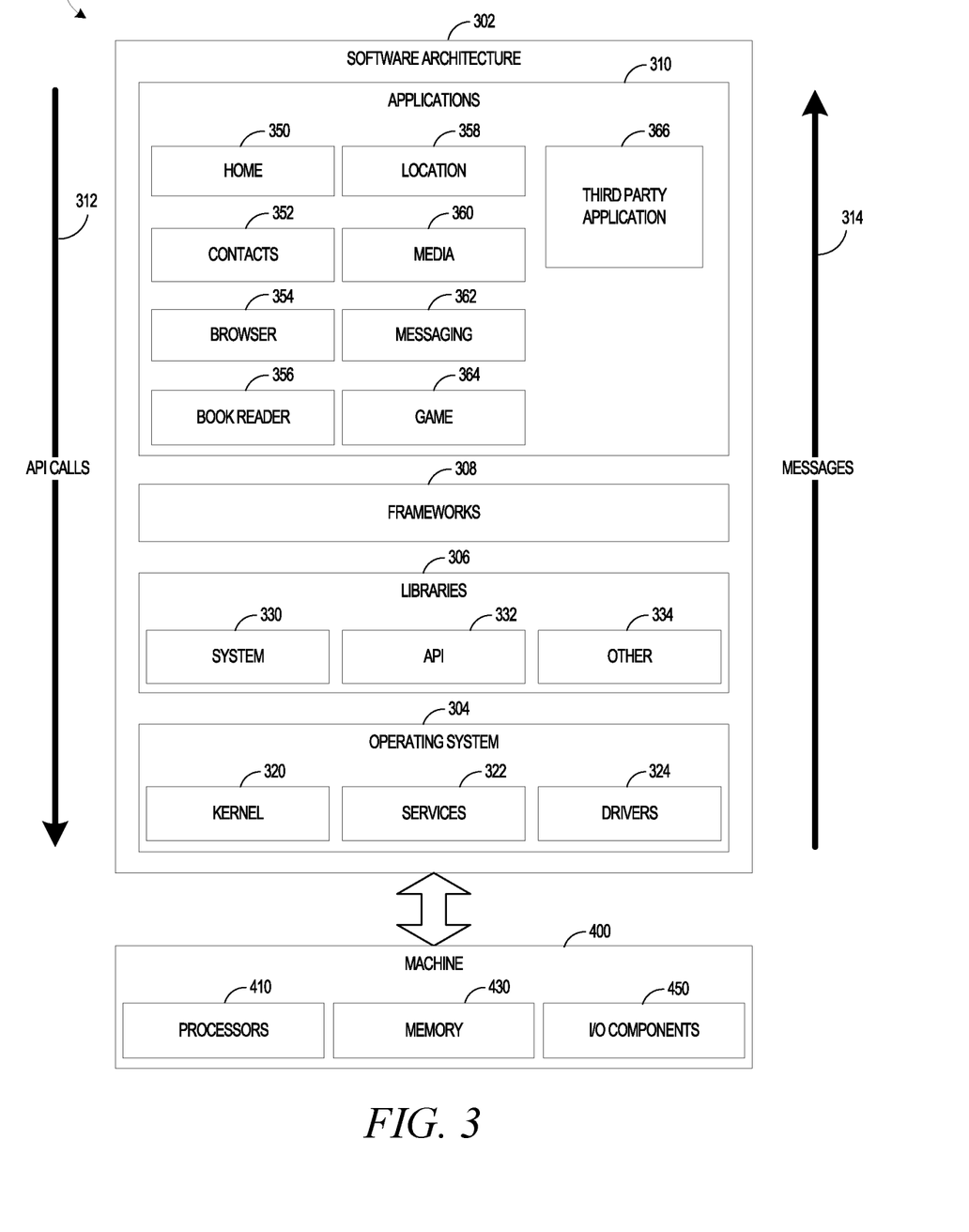
FIG. 3 is a block diagram illustrating an architecture of software, which can be installed on any one or more of the devices described above.

FIG. 3 is a block diagram 300 illustrating a software architecture 302, which can be installed on any one or more of the devices described above. FIG. 3 is merely a non-limiting example of a software architecture, and it will be appreciated that many other architectures can be implemented to facilitate the functionality described herein. In various embodiments, the software architecture 302 is implemented by hardware such as a machine 400 of FIG. 4 that includes processors 410, memory 430, and input/output (I/O) components 450. In this example architecture, the software architecture 302 can be conceptualized as a stack of layers where each layer may provide a particular functionality. For example, the software architecture 302 includes layers such as an operating system 304, libraries 306, frameworks 308, and applications 310. Operationally, the applications 310 invoke API calls 312 through the software stack and receive messages 314 in response to the API calls 312, consistent with some embodiments.

In various implementations, the operating system 304 manages hardware resources and provides common services. The operating system 304 includes, for example, a kernel 320, services 322, and drivers 324. The kernel 320 acts as an abstraction layer between the hardware and the other software layers, consistent with some embodiments. For example, the kernel 320 provides memory management, processor management (e.g., scheduling), component management, networking, and security settings, among other functionalities. The services 322 can provide other common services for the other software layers. The drivers 324 are responsible for controlling or interfacing with the underlying hardware, according to some embodiments. For instance, the drivers 324 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 306 provide a low-level common infrastructure utilized by the applications 310. The libraries 306 can include system libraries 330 (e.g., C standard library) that can provide functions such as memory allocation functions, string manipulation functions, mathematic functions, and the like. In addition, the libraries 306 can include API libraries 332 such as media libraries (e.g., libraries to support presentation and manipulation of various media formats such as Moving Picture Experts Group-4 [MPEG4], Advanced Video Coding [H.264 or AVC], Moving Picture Experts Group Layer-3 [MP3], Advanced Audio Coding [AAC], Adaptive Multi-Rate [AMR]audio codec, Joint Photographic Experts Group [JPEG or JPG], or Portable Network Graphics [PNG]), graphics libraries (e.g., an OpenGL framework used to render in two dimensions [2D] and three dimensions [3D]in a graphic context on a display), database libraries (e.g., SQLite to provide various relational database functions), web libraries (e.g., WebKit to provide web browsing functionality), and the like. The libraries 306 can also include a wide variety of other libraries 334 to provide many other APIs to the applications 310.

The frameworks 308 provide a high-level common infrastructure that can be utilized by the applications 310, according to some embodiments. For example, the frameworks 308 provide various GUI functions, high-level resource management, high-level location services, and so forth. The frameworks 308 can provide a broad spectrum of other APIs that can be utilized by the applications 310, some of which may be specific to a particular operating system 304 or platform.

In an example embodiment, the applications 310 include a home application 350, a contacts application 352, a browser application 354, a book reader application 356, a location application 358, a media application 360, a messaging application 362, a game application 364, and a broad assortment of other applications, such as a third-party application 366. According to some embodiments, the applications 310 are programs that execute functions defined in the programs. Various programming languages can be employed to create one or more of the applications 310, structured in a variety of manners, such as object-oriented programming languages (e.g., Objective-C, Java, or C++) or procedural programming languages (e.g., C or assembly language). In a specific example, the third-party application 366 (e.g., an application developed using the ANDROID™ or IOS™ software development kit [SDK] by an entity other than the vendor of the particular platform) may be mobile software running on a mobile operating system such as IOS™, ANDROID™, WINDOWS® Phone, or another mobile operating system. In this example, the third-party application 366 can invoke the API calls 312 provided by the operating system 304 to facilitate functionality described herein.

Figure 4:
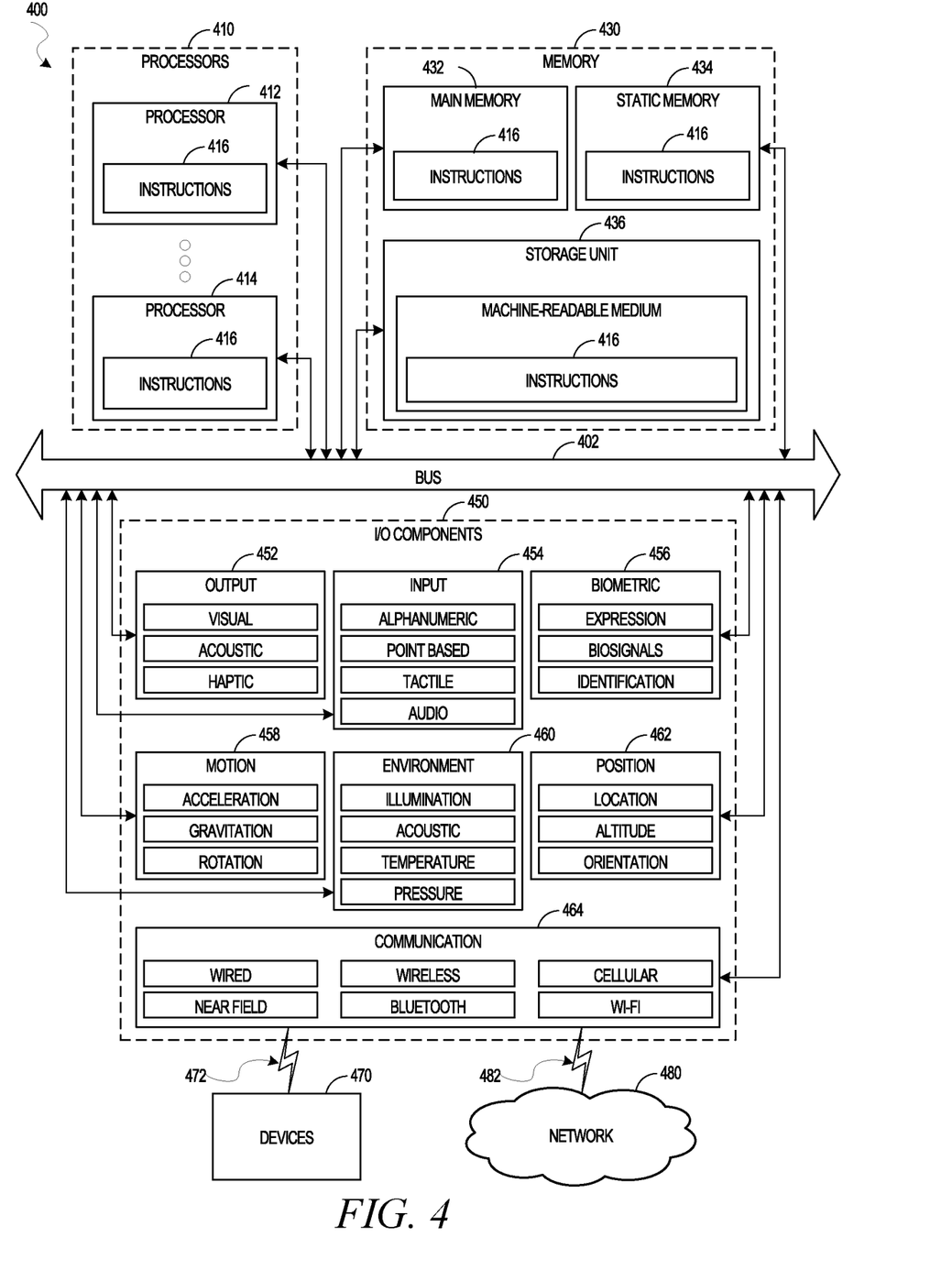
FIG. 4 illustrates a diagrammatic representation of a machine in the form of a computer system within which a set of instructions may be executed for causing the machine to perform any one or more of the methodologies discussed herein, according to an example embodiment.

FIG. 4 illustrates a diagrammatic representation of a machine 400 in the form of a computer system within which a set of instructions may be executed for causing the machine 400 to perform any one or more of the methodologies discussed herein, according to an example embodiment. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute the method 200 of FIG. 2. Additionally, or alternatively, the instructions 416 may implement FIGS. 1-2 and so forth. The instructions 416 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory 430, and I/O components 450, which may be configured to communicate with each other such as via a bus 402. In an example embodiment, the processors 410 (e.g., a central processing unit [CPU], a reduced instruction set computing [RISC]processor, a complex instruction set computing [CISC]processor, a graphics processing unit [GPU], a digital signal processor [DSP], an application-specific integrated circuit [ASIC], a radio-frequency integrated circuit [RFIC], another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions 416 contemporaneously. Although FIG. 4 shows multiple processors 410, the machine 400 may include a single processor 412 with a single core, a single processor 412 with multiple cores (e.g., a multi-core processor 412), multiple processors 412, 414 with a single core, multiple processors 412, 414 with multiple cores, or any combination thereof.

The memory 430 may include a main memory 432, a static memory 434, and a storage unit 436, each accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within the storage unit 436, within at least one of the processors 410 (e.g., within the processor's cache memory), or any suitable combination thereof, during execution thereof by the machine 400.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion, and the grouping is in no way limiting. In various example embodiments, the I/O components 450 may include output components 452 and input components 454. The output components 452 may include visual components (e.g., a display such as a plasma display panel [PDP], a light-emitting diode [LED]display, a liquid crystal display [LCD], a projector, or a cathode ray tube [CRT]), acoustic components (e.g., speakers), haptic components (e.g., a vibratory motor, resistance mechanisms), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Positioning System [GPS]receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., coupled via a USB).

Moreover, the communication components 464 may detect identifiers or include components operable to detect identifiers. For example, the communication components 464 may include radio-frequency identification (RFID) tag reader components, NFC smart tag detection components, optical reader components (e.g., an optical sensor to detect one-dimensional bar codes such as Universal Product Code [UPC] bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

The various memories (e.g., 430, 432, 434, and/or memory of the processor(s) 410) and/or the storage unit 436 may store one or more sets of instructions 416 and data structures (e.g., software) embodying or utilized by any one or more of the methodologies or functions described herein. These instructions (e.g., the instructions 416), when executed by the processor(s) 410, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network, and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., HTTP). Similarly, the instructions 416 may be transmitted or received using a transmission medium via the coupling 472 (e.g., a peer-to-peer coupling) to the devices 470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 416 for execution by the machine 400, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor;
   a computer-readable medium storing instructions that, when executed by the at least one hardware processor, cause the at least one hardware processor to perform operations comprising:
   accessing a context of an online chat between a user and an unknown participant;
   creating a communication channel directly between a testing application and the unknown participant, using the context;
   using a first cluster of the testing application to send a first question to the unknown participant and measure speed at which the unknown participant responds;
   generating a first score indicative of a likelihood that the unknown participant is an artificial intelligence (AI) component based on the speed;
   using a second cluster of the testing application to send a second question combined with dynamically generated data to the unknown participant;
   generating a second score indicative of a likelihood that the unknown participant is an AI component based on one or more responses to the second question;
   using a third cluster of the testing application to send a third question combined with dynamically generated data to the unknown participant;
   generating a third score indicative of a likelihood that the unknown participant is an AI component based on one or more responses to the third question;
   using a fourth cluster of the testing application to send a fourth question combined with dynamically generated data to the unknown participant;
   generating a fourth score indicative of a likelihood that the unknown participant is an AI component based on one or more responses to the fourth question; and
   combining the first, second, third, and fourth scores.

2. The system of claim 1, wherein the first question is a question designed to elicit a long response.

3. The system of claim 1, wherein the second question is a question designed to check language-specific characteristics of a response.

4. The system of claim 1, wherein the second question is a question asking facts about a recent news article.

5. The system of claim 1, wherein the second question is a question asking facts about enterprise data.

6. The system of claim 1, wherein the generating a second score comprises utilizing a first machine learning model trained by a first machine learning algorithm.

7. The system of claim 6, wherein the generating a third score comprises utilizing a second machine learning model trained by a third machine learning algorithm.

8. The system of claim 7, wherein the generating a fourth score comprises utilizing a third machine learning model trained by a third machine learning algorithm.

9. The system of claim 8, wherein the combining comprises calculating a weighted average of the first score, second score, third score, and fourth score, wherein a weight assigned to each of the first score, second score, third score, and fourth score is learned by a fourth machine learning model based on the context.

10. A method comprising:
accessing a context of an online chat between a user and an unknown participant;
creating a communication channel directly between a testing application and the unknown participant, using the context;
using a first cluster of the testing application to send a first question to the unknown participant and measure speed at which the unknown participant responds;
generating a first score indicative of a likelihood that the unknown participant is an artificial intelligence (AI) component based on the speed;
using a second cluster of the testing application to send a second question combined with dynamically generated data to the unknown participant;
generating a second score indicative of a likelihood that the unknown participant is an AI component based on one or more responses to the second question;
using a third cluster of the testing application to send a third question combined with dynamically generated data to the unknown participant;
generating a third score indicative of a likelihood that the unknown participant is an AI component based on one or more responses to the third question;
using a fourth cluster of the testing application to send a fourth question combined with dynamically generated data to the unknown participant;
generating a fourth score indicative of a likelihood that the unknown participant is an AI component based on one or more responses to the fourth question; and
combining the first, second, third, and fourth scores.

11. The method of claim 10, wherein the first question is a question designed to elicit a long response.

12. The method of claim 10, wherein the second question is a question designed to check language-specific characteristics of a response.

13. The method of claim 10, wherein the second question is a question asking facts about a recent news article.

14. The method of claim 10, wherein the second question is a question asking facts about enterprise data.

15. The method of claim 10, wherein the generating a second score comprises utilizing a first machine learning model trained by a first machine learning algorithm.

16. The method of claim 15, wherein the generating a third score comprises utilizing a second machine learning model trained by a third machine learning algorithm.

17. The method of claim 16, wherein the generating a fourth score comprises utilizing a third machine learning model trained by a third machine learning algorithm.

18. A non-transitory machine-readable medium storing instructions which, when executed by one or more processors, cause the one or more processors to perform operations comprising:
accessing a context of an online chat between a user and an unknown participant;
creating a communication channel directly between a testing application and the unknown participant, using the context;
using a first cluster of the testing application to send a first question to the unknown participant and measure speed at which the unknown participant responds;
generating a first score indicative of a likelihood that the unknown participant is an artificial intelligence (AI) component based on the speed;
using a second cluster of the testing application to send a second question combined with dynamically generated data to the unknown participant;
generating a second score indicative of a likelihood that the unknown participant is an AI component based on one or more responses to the second question;
using a third cluster of the testing application to send a third question combined with dynamically generated data to the unknown participant;
generating a third score indicative of a likelihood that the unknown participant is an AI component based on one or more responses to the third question;
using a fourth cluster of the testing application to send a fourth question combined with dynamically generated data to the unknown participant;
generating a fourth score indicative of a likelihood that the unknown participant is an AI component based on one or more responses to the fourth question; and
combining the first, second, third, and fourth scores.

19. The non-transitory machine-readable medium of claim 18, wherein the first question is a question designed to elicit a long response.

20. The non-transitory machine-readable medium of claim 18, wherein the second question is a question designed to check language-specific characteristics of a response.

* * * * *